(12) United States Patent
Gholmieh et al.

(10) Patent No.: US 7,796,507 B2
(45) Date of Patent: Sep. 14, 2010

(54) METHOD AND APPARATUS FOR COMMUNICATION NETWORK CONGESTION CONTROL

(75) Inventors: Ralph Gholmieh, San Diego, CA (US); Kuo-Chun Lee, San Diego, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 863 days.

(21) Appl. No.: 11/321,727

(22) Filed: Dec. 29, 2005

(65) Prior Publication Data

US 2007/0153695 A1 Jul. 5, 2007

(51) Int. Cl.
*H04L 12/26* (2006.01)

(52) U.S. Cl. .................. 370/229; 370/412; 709/223
(58) Field of Classification Search ............ None
See application file for complete search history.

(56) References Cited

U.S. PATENT DOCUMENTS

| | | | | |
|---|---|---|---|---|
| 6,657,962 B1 * | 12/2003 | Barri et al. | ............ | 370/235 |
| 7,180,862 B2 * | 2/2007 | Peebles et al. | ............ | 370/235 |
| 7,212,534 B2 * | 5/2007 | Kadambi et al. | ............ | 370/395.2 |
| 7,239,636 B2 * | 7/2007 | Kadambi et al. | ............ | 370/395.2 |
| 2004/0160914 A1 * | 8/2004 | Sarkar | ............ | 370/329 |
| 2004/0264377 A1 * | 12/2004 | Kilkki et al. | ............ | 370/235 |
| 2006/0092840 A1 * | 5/2006 | Kwan et al. | ............ | 370/230.1 |
| 2007/0053294 A1 * | 3/2007 | Ho et al. | ............ | 370/235 |

* cited by examiner

*Primary Examiner*—Hong Cho
*Assistant Examiner*—Robert C Scheibel
(74) *Attorney, Agent, or Firm*—Coats & Bennett, P.L.L.C.

(57) ABSTRACT

A communication network node, such as a radio base station or base station controller in a wireless communication network, is configured to monitor and control ingress and egress data congestion. As such, node-based congestion monitoring provides a method of flow control between network nodes and, as such, for example, it may be used to control congestion on backhaul links between radio base stations and base station controllers, and on sidehaul links between base station controllers. In one embodiment, the node monitors egress and ingress data congestion conditions, and marks ingress data incoming to the node to indicate congestion. For example, if ingress data markings indicate ingress data congestion, the node can send signaling to initiate a reduction in the amount of data being sent to the node, e.g., a reduction in ingress data rates. If ingress data markings indicate egress data congestion, the node can reduce egress data rates.

48 Claims, 6 Drawing Sheets

METHOD AND APPARATUS FOR COMMUNICATION NETWORK CONGESTION CONTROL

BACKGROUND OF THE INVENTION

The present invention generally relates to communication networks, such as wireless communication networks, and particularly relates to congestion control within such networks.

Inter-node connections within communication networks can give rise to congestion problems. For example, some types of next-generation wireless communication networks use Internet Protocol (IP) and/or Asynchronous Transfer Mode (ATM) delivery networks between communication nodes within the larger wireless communication network. Non-limiting examples of such networks include those based on cdma2000 (Rev. D) standards, Wideband CDMA (WCDMA) standards, and High Rate Packet Data (HRPD) standards, such as those based on the IS-856 standards.

In particular, WCDMA-based Radio Access Networks (RANs) use ATM-based delivery networks to couple Radio Base Stations (RBSs) with their supporting Radio Network Controllers (RNCs). The network connection between a given RBS, referred to as a "Node B" in the WCDMA-related standards, and its supporting RNC may comprise multiple ATM hops. Further, the ATM Adaptation Layer 2 (AAL2) connections comprising the overall connection path may be switched onto different AAL2 paths at intermediate nodes within the ATM delivery network. Similar RNC-to-RBS connection complexities may arise in RANs based on the cdma2000 standards.

Delivery bottlenecks may arise in such network connections. That is, the delivery networks between RNCs and RBSs can become congested and, therefore, represent a potential communication bottleneck that can result in degraded service on one or more of the data connections being supported through the RBSs and their corresponding RNCs.

SUMMARY OF THE INVENTION

In one embodiment of congestion control as taught herein, a method of congestion control at a communication network node comprises monitoring egress and/or ingress data congestion conditions at the node. For egress congestion monitoring, the method includes reducing egress data rates responsive to detecting egress data congestion, and for ingress congestion monitoring, the method includes reducing ingress data rates responsive to detecting ingress data congestion. Egress data congestion can be detected, for example, by comparing monitored egress communication link to one or more utilization thresholds, which may be configurable. Alternatively or additionally, egress data congestion can be detected by comparing egress queue sizes to one or more queue size thresholds, which may be configurable. The same or similar detection mechanisms can be used to detect ingress congestion.

Congestion may be indicated by, for example, setting ingress and egress congestion indicators in ingress data incoming to the node. Such indicators can then be recognized by the internal processing elements within the node that process the ingress data. As such, ingress or egress congestion indicators can be, if desired, selectively set in particular ones of the incoming ingress data streams, such that congestion control is enacted only on selected ones of the ingress or egress data streams.

In another embodiment of congestion control as taught herein, a communication network node for use in a communication network comprises one or more processing circuits configured to monitor for egress and/or ingress data congestion at the node. For egress congestion monitoring, the one or more processing circuits may be configured to set one or more egress congestion indicators if said egress monitoring indicates egress data congestion, and reduce egress congestion responsive to the one or more egress congestion indicators. For ingress congestion monitoring, the one or more processing circuits can be configured to set one or more ingress congestion indicators if said ingress monitoring indicates ingress data congestion, and reduce ingress congestion responsive to the one or more ingress congestion indicators.

The one or more processing circuits may comprise hardware, software, or any combination thereof. Further, the one or more processing circuits may be configured as a centralized congestion detection circuit and/or as a centralized congestion control circuit. Alternatively, the one or more processing circuits can be implemented on a distributed basis within the node. For example, the node may include centralized congestion monitoring circuits having visibility across all incoming and outgoing data streams, but may rely on distributed data or call processing elements in the node to implement congestion control on all or selected ones of the data streams. For example, in a wireless communication node, a plurality of control or service elements each handle ingress and egress data streams corresponding to a user equipment data connection being supported by the node. Each such control or service element can initiate congestion control (such as data throttling) on the streams being handled by it, in response to congestion being indicated.

Of course, the present invention is not limited to the above features and advantages. Those skilled in the art will recognize additional features and advantages upon reading the following detailed description, and upon viewing the accompanying drawings.

DETAILED DESCRIPTION OF THE INVENTION

Figure 1:
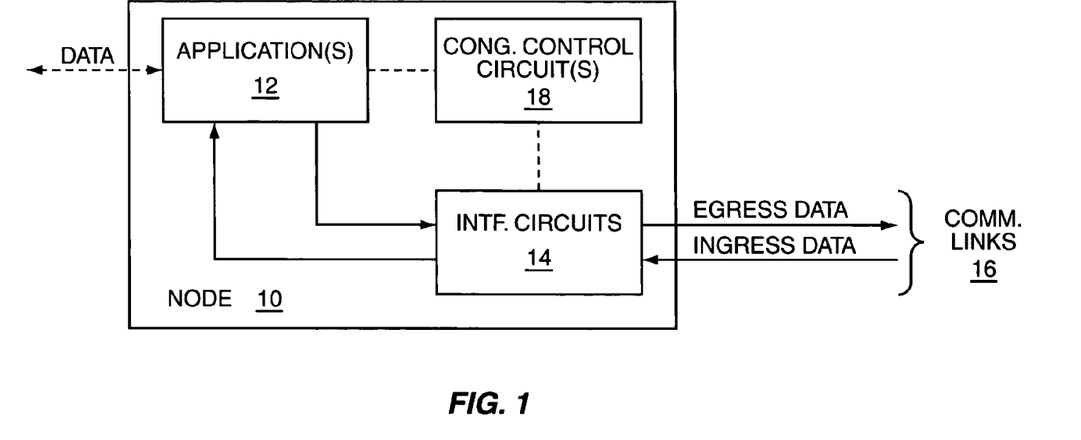
FIG. 1 is a block diagram of a communication network node according to one embodiment of congestion control.

FIG. 1 illustrates a communication network node 10 for use in a communication network. The node 10 is configured to implement congestion control responsive to detecting egress and/or ingress data congestion conditions. In at least some embodiments, such flow control operates independently from any protocol-based flow control operating at higher network layers.

Turning to the details, the illustrated embodiment of the node 10 comprises one or more applications 12 sending and receiving data from the node 10 via interface circuits 14, which communicatively couple to one or more other network nodes—not shown—through egress and ingress communication links 16. The term "applications" as used herein denotes functional or physical processing resources allocated to processing ingress/egress data for a given data stream, or streams. For example, the node 10 may comprise a radio base station in a wireless communication network, in which case the applications 12 may represent a plurality of call processing elements (CEs) allocated to processing different ones in the plurality of user data streams being supported by the radio base station.

Figure 2:
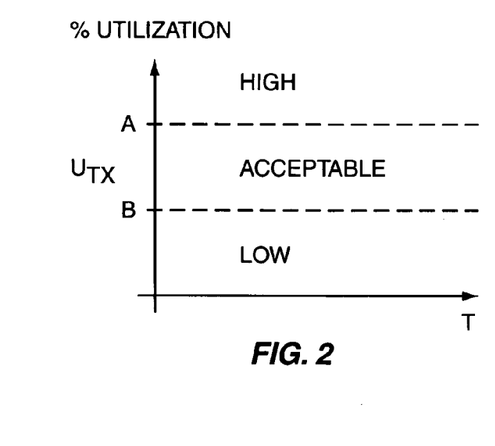
FIGS. 2-4 are graphs corresponding to egress and ingress congestion detection logic that may be implemented by the node of FIG. 1, for example.
Figure 3:
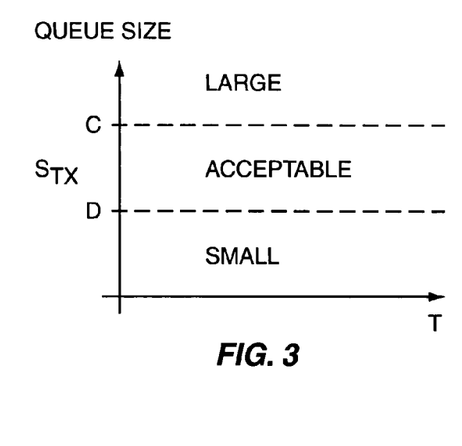
Figure 4:
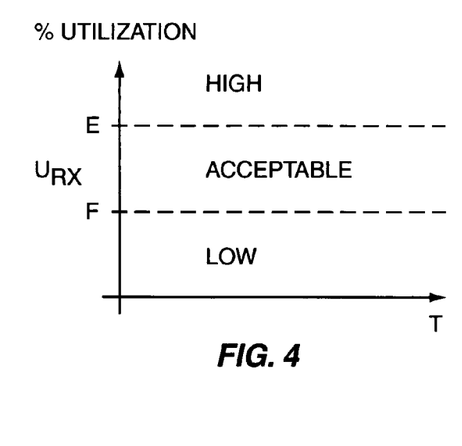

While details related to wireless communication network embodiments appear later herein, FIGS. 2-4 illustrate broad but non-limiting bases for detecting egress and ingress congestion conditions on the communication links 16. That is, the congestion control circuit(s) 18 depicted in the node 10 can, according to various embodiments described herein, comprise one or more processing circuits configured to monitor for egress and ingress data congestion at the node 10, set one or more egress congestion indicators if said egress monitoring indicates egress data congestion and set one or more ingress congestion indicators if said ingress monitoring indicates ingress data congestion, and reduce egress congestion responsive to the one or more egress congestion indicators, and reduce ingress congestion responsive to the one or more ingress congestion indicators.

For example, FIG. 2 illustrates monitoring egress data congestion by comparing egress communication link utilization ($U_{TX}$) to one or more utilization thresholds as a means for detecting egress congestion. More particularly, the congestion control circuit 18 may compare monitored egress link utilization to upper (HIGH) and lower (LOW) utilization thresholds A and B, respectively. Link utilization may be measured, for example, as a percentage of maximum or targeted capacity, which may be expressed in data rate, bandwidth utilization, and/or the number of bytes transmitted on a give port per unit of time. Regardless, monitored egress link utilization will fall, according to the logic of FIG. 2, into one of three utilization regions—high utilization, indicating egress congestion; acceptable utilization, indicating that the egress link is not over or underutilized; and low utilization, indicating that the egress link is underutilized.

The egress congestion determination logic of FIG. 2 can be supplemented with the logic illustrated in FIG. 3, which directs itself to egress data queue size monitoring as a means of detecting egress conditions. (Note, too, that the egress congestion detection logic represented by FIG. 3 can, if desired, be substituted for that of FIG. 2.) In any case, in FIG. 3, one sees that the congestion control circuit 18 may detect egress congestion conditions by comparing egress data queue size ($S_{Tx}$) to one or more queue size thresholds. More particularly, the monitored egress queue size can be compared to an upper (HIGH) threshold C, and to a lower (LOW) threshold D. Thus, monitored egress queue size will fall into one of three regions—large queue size, indicating egress data congestion; acceptable queue size, indicating that the egress link is not over or underutilized; and small queue size, indicating that the egress link is underutilized.

FIG. 4 is similar to FIG. 2, except that it illustrates ingress data congestion monitoring, based on comparing ingress communication link utilization ($U_{RX}$) to one or more ingress link utilization threshold—i.e., an upper (HIGH) threshold E, and a lower (LOW) threshold F. As with egress congestion monitoring, ingress link utilization can be monitored and compared to the thresholds, such that ingress congestion is declared if the ingress link utilization is above threshold E.

It should be understood that one or more of the egress/ingress link utilization thresholds and the egress queue size thresholds described above can be pre-configured and stored in the node 10 as default values. Alternatively, in at least one embodiment of the node 10, one or more of the thresholds are programmable and/or adaptive. For example, a given threshold can be initially determined and/or dynamically updated based on observed measurements. Further, it should be understood that comparing monitored values to the thresholds can be based on comparing filtered measurements of utilization and queue size.

With the above points in mind, and in accordance with at least one embodiment of congestion control as taught herein, egress data congestion is declared if UTX≧threshold A, or IF STX≧threshold C. That is, the indication of egress data congestion is to be set if either egress link utilization or egress data queue size is the respective high threshold. Conversely, the indication of egress data congestion is cleared if both egress link utilization or egress data queue size are below their respective high thresholds. Similarly, ingress data congestion is declared if URX≧threshold E, i.e., ingress data congestion indication is set if the ingress link utilization is above the upper utilization threshold, and is cleared if not. Hysteresis may be applied to such clearing, to avoid overly frequent setting and clearing of congestion indicators, although using filtered values for the monitored conditions, e.g., link utilization, may provide reliable congestion indication without need for hysteresis.

The congestion detection logic detailed immediately above, and other variations of that logic as described herein, can be embodied physically or functionally in the congestion control circuit(s) 18, which may comprise hardware, software, or any combination thereof. For example, the congestion control circuit(s) 18 may comprise one or more general-purpose or special purpose processing circuits, such as one or more microprocessors, digital signal processors, application specific integrated circuits, and/or programmable logic devices. In such contexts, the congestion control methods described herein may be implemented as computer program instructions stored in a computer readable medium included with or accessible by the congestion control circuit(s) 18. For example, the congestion control circuit(s) 18 may include, or may have access to, one or more memory circuits and/or other electronic, electromechanical, or electro-optical storage devices.

Figure 5:
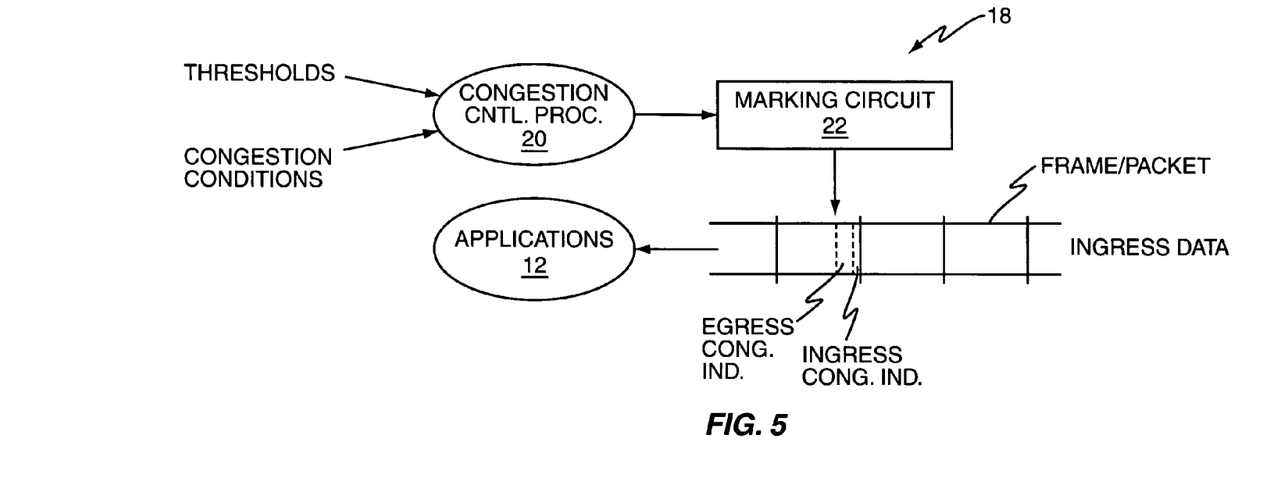
FIG. 5 is a block diagram illustrating functional processing circuits that may be used to implement one embodiment of ingress/egress congestion indication at a communication network node.

Regardless of such configuration details, FIG. 5 illustrates one embodiment for setting and clearing egress and ingress congestion indicators at the node 10. In the illustration, one sees that the congestion control circuit(s) 18 can be configured to set the one or more egress and ingress congestion indicators by setting egress and ingress congestion indicators in the ingress data. For example, the ingress data may be received or otherwise organized into frames or packets, and the congestion control circuit(s) 18 can cause ingress data incoming to the node 10 to be marked with ingress and egress congestion indicators.

Thus, in one embodiment, the congestion control circuit(s) 18 comprise a congestion control processor 20 and a (data) marking circuit 22. The congestion control processor 20 determines whether to indicate ingress and/or egress congestion by evaluating monitored congestion conditions—e.g., link utilization levels—with congestion thresholds. Ingress and egress congestion conditions are indicated to the marking circuit 22, which sets or clears corresponding ingress and egress congestion indicators (flags, such as bitwise flags) in the ingress data incoming to the node 10. These indicators, for example, can be added as bits to ingress data frames incoming to the node 10. Note, too, that the ingress data incoming to the node 10 may comprise a plurality of distinct or separate data streams, such as might be associated with different calls in wireless communication network. Thus, data marking may be applied selectively to particular ones of the incoming data streams, or, if desired, applied to all incoming data.

By marking the incoming data, the applications 12 can be appraised of ingress and egress data congestion by virtue of recognizing the set/cleared state of the congestion indicators included in the incoming data by the marking circuit 22. Note, too, that indicating congestion by marking the incoming data in this manner does not require any data protocol changes because such marking remains local to the node 10. Further, with selective marking, wherein congestion is indicated only in selected ones of the data streams, the node 10 can pick the particular ones of the applications 12 that are informed of the data congestion conditions, which means that only selected ones of the applications 12 will respond to the congestion conditions.

Figure 6:
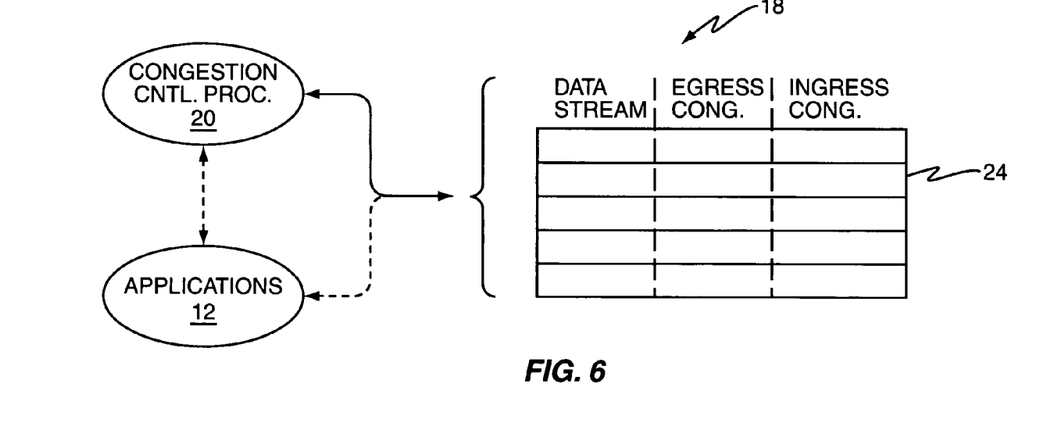
FIG. 6 is a block diagram illustrating functional processing circuits that may be used to implement another embodiment of ingress/egress congestion indication at a communication network node.

Other methods of indicating congestion are contemplated herein. For example, as illustrated in FIG. 6, the congestion control processor 20 may be configured to maintain a congestion condition table 24 at the node 10. The applications 12 can poll for updated table contents and/or the congestion control processor 20 can be configured to periodically report congestion conditions to the applications 12.

Regardless of whether tables or data marking is used, it should be understood that congestion conditions can be monitored for individual ones of the data streams being supported by the node 10, and reported to the corresponding ones of the applications 12, or reported to other, lower-priority or lower-performance ones of the applications 12. Alternatively, ingress and/or egress congestion can be tracked in the aggregate and reported to all applications 12, or reported to selected ones of the applications 12.

In any case, the particular ones of the applications 12 that are aware of data congestion conditions can take one or more actions to relieve that congestion. For example, in response to detected egress data congestion, one or more of the applications 12 may throttle outgoing data rates, or otherwise act to reduce the amount of outgoing egress data, therefore relieving egress congestion. Ingress data congestion may be regarded as the problem of too much data being sent to the node 10 on the congested communication link. Therefore, to reduce ingress data congestion, one or more of the applications 12 may reduce the amount of ingress data incoming to the node 10 by sending signaling requesting such reduction. For example, assuming that another network node originates the ingress data incoming to the node 10, the node 10 can send signaling to that other node, thereby causing the other node to throttle data rates for one or more data streams outgoing from it to the node 10.

Figure 7:
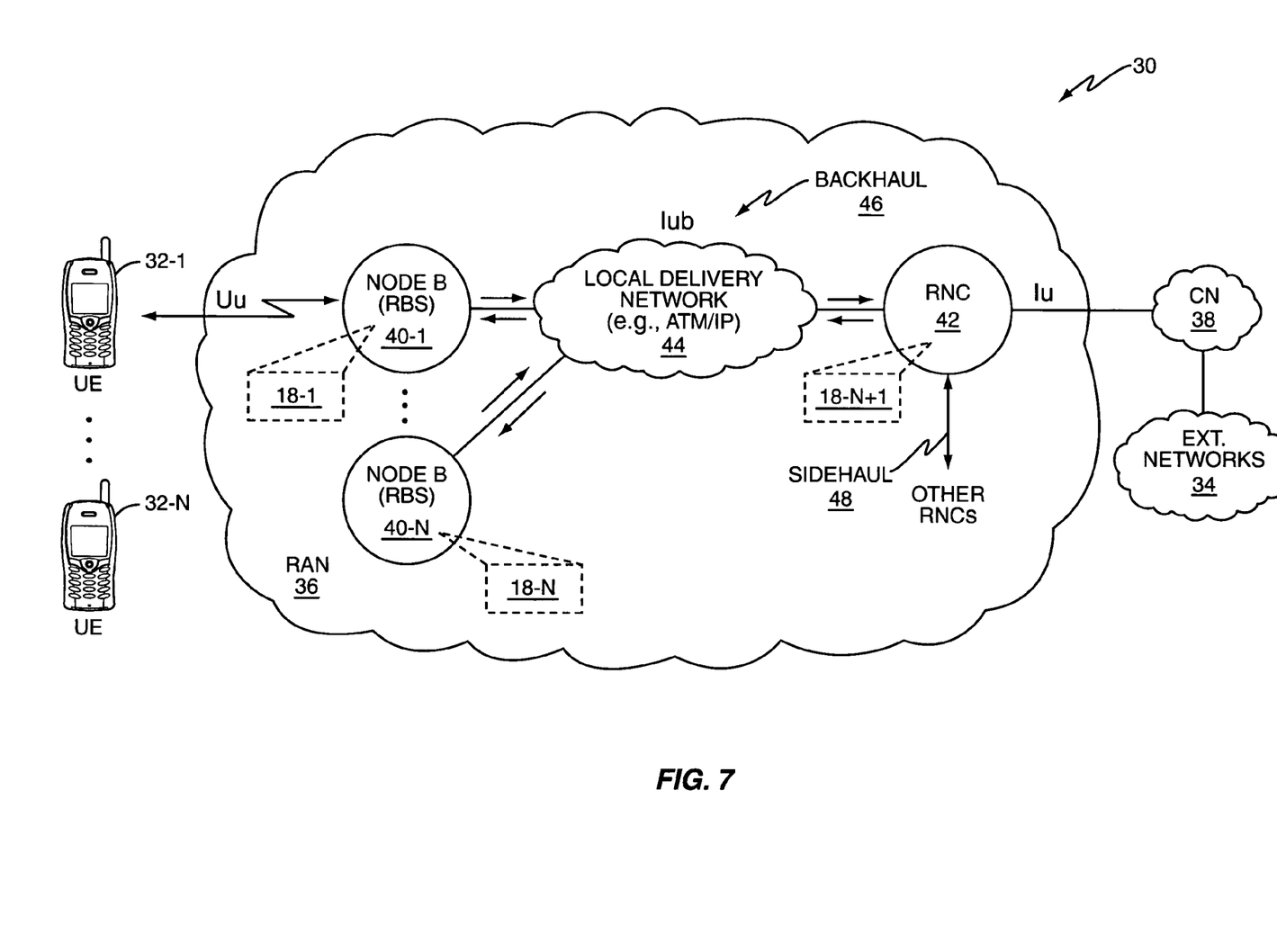
FIG. 7 is a block diagram of a wireless communication network, including one or more wireless communication network nodes configured according to one or more embodiments of congestion control.

The other node or nodes involved with the node 10 will depend on the particular type of communication network involved. For example, FIG. 7 illustrates a wireless communication network 30, which communicatively couples user equipment (UE) 32-1 through 32-N to one or more external networks 34. The wireless communication network 30 includes a Radio Access Network (RAN) 36, which provides radio communication for the UE 32, and which communicatively couples to one or more Core Networks (CN) 38. In turn, the CN 38 is communicatively coupled to the external networks 34. The network 30 may, for example, comprise a WCDMA-based cellular radio network, a cdma2000-based cellular radio network, a HDR-based cellular radio network, or may comprise some other type of wireless communication network. As such, the UE 32-1 through 32-N may comprise cellular telephones or other types of mobile stations, such as wireless pagers, Portable Digital Assistants, laptop/palmtop computer and/or wireless add-in cards for such computers, or the like. Further, it will be understood that the one or more external networks may comprise, without limitation or exclusion, one or more of the Internet, private IP networks, public or private ISDN systems, the PSTN, etc.

The RAN 36 includes a number of radio base stations (RBSs) 40-1 through 40-N, which are referred to as "Node Bs" in the WCDMA standards. The RBSs 40 are coupled to a Radio Network Controller (RNC) 42 through a local delivery network 44 providing the RBS-to-RNC backhaul 46. The local delivery network 44 may comprise an ATM-based delivery network. In at least one embodiment, the RBSs 40 and the RNC 42 support best-efforts connections through the local delivery network 44, such that the individual data streams associated with the different UE connections can be supported at different data rates, qualities of service (QoS), grades of service (GoS). With or without best-efforts delivery, the communication links provided by the local delivery network 44 can represent a potential congestion bottleneck between the RBSs 40 and the RNC 42, particularly given the increasing prevalence of high data rate services for packet data users.

To that end, the RBSs 40-1 through 40-N can include an embodiment of the congestion control circuit(s) 18 described previously herein, i.e., congestion control circuits 18-1 through 18-N, as can the RNC 42, i.e., congestion control circuit 18-(N+1). The congestion control circuits 18 included in the RBSs 40 and the RNC 42 can be configured to monitor for backhaul congestion, i.e., congestion on the data links into and out of the local delivery network 44. Further, the congestion control circuit 18 in the RNC 42 can be configured to monitor for sidehaul congestion, i.e., congestion on the sidehaul 48 communicatively linking the RNC 42 with other RNCs in the RAN 36.

Figure 8:
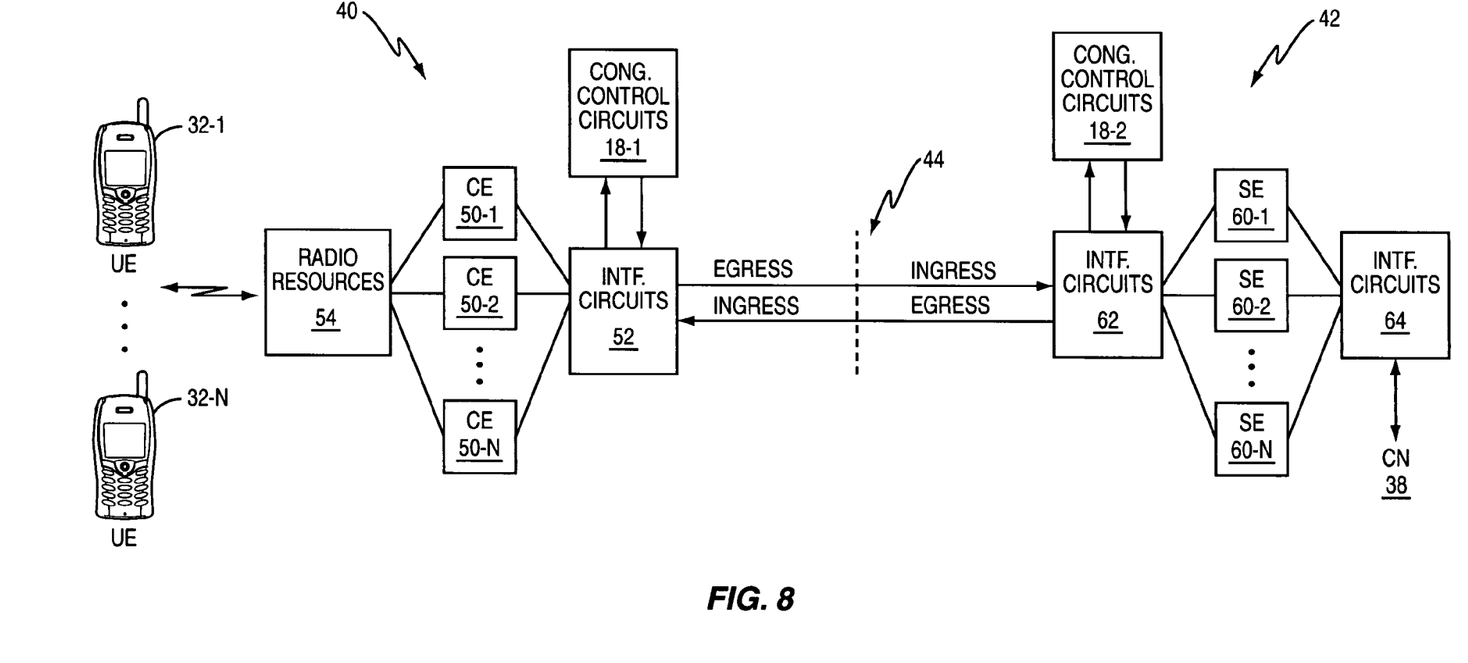
FIG. 8 is a block diagram providing details for one or more embodiments of congestion control in a radio base station and a radio network controller, such as can be used in the wireless communication network of FIG. 7, for example.

FIG. 8 illustrates details for one embodiment of an RBS 40 and an RNC 42, which are communicatively coupled together through the local delivery network 44. One sees that the local delivery network 44 carries a plurality of data streams, each of which may be associated with a different one of the UE 32-1 through 32-N. Indeed, each UE 32 may be running more than one application, such as concurrent email, streaming, and web browsing applications, meaning that each UE 32 may have multiple data streams associated with it.

The illustrated RBS 40 includes, in addition to the congestion control circuit 18-1, control elements (CE) 50-1 through 50-N, interface circuits 52, and radio circuits 54. The interface circuits 52 communicatively link the RBS 40 to the RNC 42 through egress and ingress links with the local delivery network 44, while the radio circuits 54 include radio resources communicatively linking the RBS 40 with the UEs 32. The CEs 50 act as individual application/call control processors for the data streams being supported by the RBS 40.

At the other end of the local delivery network 44, the illustrated RNC 42 includes, in addition to the congestion control circuit 18-2, interface circuits 62, service elements (SE) 60-1 through 60-N, and interface circuits 64. The interface circuits 64 provide communicative coupling to the CN 38, while the interface circuits 62 communicatively couple the RNC 42 to the RBS 40 through ingress and egress links with the local delivery network 44. Notably, the SEs 60-1 through 60-N correspond in call control terms with the CEs 50-1 through 50-N, and it should be understood that the CEs 50 and the SEs 60 can respond to ingress and egress congestion indicators as set and cleared by the congestion control circuits 18-1 and 18-2, respectively.

Figure 9:
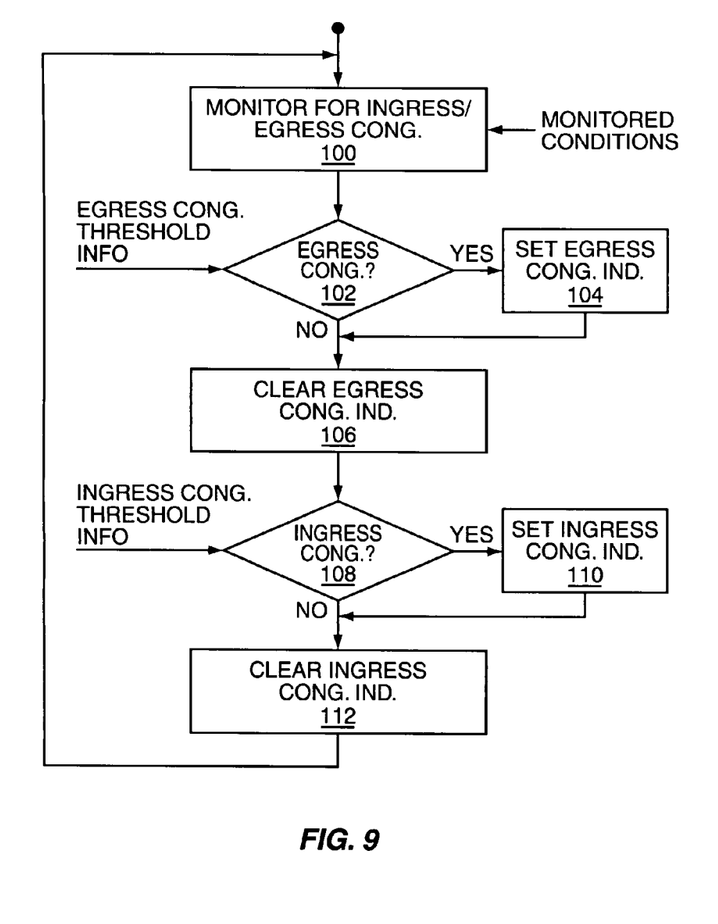
FIG. 9 is a logic flow diagram for one embodiment of congestion control logic, such as might be implemented in the radio base station or radio network controller of FIG. 8, for example.

For example, FIG. 9 illustrates congestion monitoring and control processing logic that can be implemented in hardware and/or software at the RBS 40 and/or the RNC 42 shown in FIG. 8. While the processing logic depicts sequentially ordered processing, it should be understood that at least some of the actions depicted in FIG. 9 can be performed in a different order and/or can be performed concurrently. Further, the following discussion assumes operations at the RBS 40, but it should be understood that the same or similar operations may be ongoing at the RNC 42.

Assuming ongoing data communications via one or more data streams flowing between the RBS 40 and the RNC 42 via the local delivery network 44, congestion control processing at the RBS 40 "begins" with monitoring for ingress and egress congestion on the communication links to and from the local delivery network 44 (Step 100). Such monitoring can be based on monitoring link utilizations, queue buffer sizes, etc.

If the RBS 40 detects egress congestion (Step 102), it sets one or more egress congestion indicators (Step 104). One or more of the CEs 50-1 through 50-N within the RBS 40 throttle egress data rates, or otherwise operates to reduce the amount of egress data outgoing from the RBS 40, responsive to the one or more egress congestion indicators being set. In that sense, the control logic included in the CEs 50 that make them responsive to the congestion indicators can be considered as comprising a portion of the congestion control circuit 18-1 shown in FIG. 8. If no egress congestion is detected, the egress congestion indicators can be cleared (Step 106). As noted, setting and clearing the egress (and ingress) congestion indicators can be based on monitoring averaged congestion condition measurements to prevent overly frequent setting/clearing of congestion indicators. Additionally, or alternatively, hysteresis may be applied to the setting/clearing logic for similar effect.

Processing continues with determining whether there is ingress congestion (Step 108). If so, the RBS 40 sets one or more ingress congestion indicators (Step 110). One or more of the CEs 50-1 through 50-N within the RBS 40 may, in response to the ingress congestion indicator(s) being sent, send signaling to one or more other network nodes to reduce the amount of ingress data being sent to the RBS 40. For example, if ingress congestion is detected by the RBS 40, one or more of the CEs 50 in the RBS 40 may send signaling to corresponding ones of the SEs 60 in the RNC 42. In response, the signaled SEs 60 may throttle one or more outgoing data streams originating from them, to reduce the amount of ingress data incoming to the RBS 40. Finally, if no ingress data congestion is detected, the RBS 40 clears any ingress congestion indicators that currently are set (Step 112).

Figure 10:
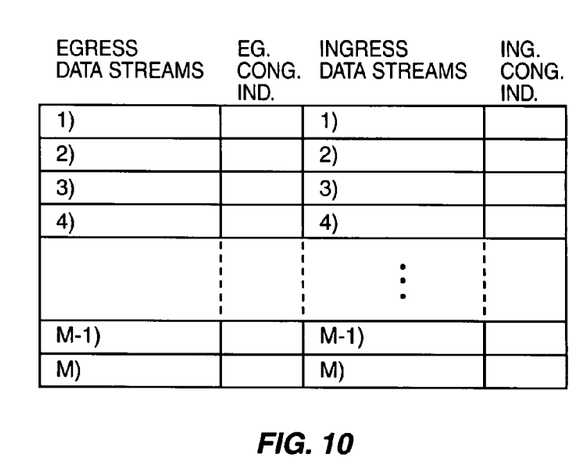
FIG. 10 is a diagram of a table that may be literally or functionally implemented in a communication network node, wherein congestion control indicators can be set or otherwise tracked for selected ones in a plurality of egress and ingress data streams.

By way of non-limiting example, FIG. 10 illustrates the significant variability in the methods chosen for indicating and responding to egress and ingress data congestion. More particularly, FIG. 10 illustrates a table or list of egress data streams (M−1) and corresponding ingress data streams (M−1), with corresponding egress and ingress congestion indicators. Such a table may be literally or functionally implemented within the RBS 40 (or RNC 42). In one embodiment, each one of the CEs 50 in the RBS 40 handle one or more data connections associated with a given one of the UEs 32-1 through 32-N. For example, a given one of the UEs 32 may be running multiple applications, such as email, streaming, web browsing, and Voice-over-IP (VOIP) applications, and each such application may have corresponding ingress and egress data streams being handled by a given one of the CEs 50 in the RBS 40.

Thus, in at least one embodiment, the egress data streams outgoing from the RBS 40 have corresponding ingress data streams incoming to the RBS 40, and different pairs of these egress/ingress data streams are handled by different ones of the CEs 50. Similarly stream handling is implemented in the RNC 42, and respective ones of the SEs 60 may correspond with respective ones of the CEs 50.

With the above in mind, it should be understood that the RBS 40 (or RNC 42) can detect egress data congestion in the aggregate—i.e., overall congestion across all egress data streams—or can detect egress congestion on a per-stream basis. In either case, egress congestion indication may be marked for all egress data streams, or marked for specific ones of the egress data streams. For example, one or more egress data streams may have high data rate or performance requirements, and congestion may be detected for them. Such egress data streams may be given priority over egress data streams associated with lower performance requirements. As such, egress data congestion indicators can be set for one or more of the lower priority egress data streams, causing the corresponding CEs 50 to throttle egress data on those lower priority streams, while the CEs 50 handling the higher priority egress data streams do not impose throttling on the higher priority egress data streams. Alternatively, egress congestion can be marked for the particular streams for which egress congestion is detected, or can be marked for all egress data streams.

Similar congestion indication logic can be applied to the ingress congestion detection and control at the RBS 40 (or RNC 42). For example, ingress congestion may be detected on a high priority ingress data stream, and an ingress congestion indicator could be set for a lower-priority ingress data stream, such that the CE 50 handling the lower priority ingress data stream would send signaling to the corresponding SE 60 in the RNC 42 to initiate throttling of the lower priority ingress data stream. Of course, ingress data congestion can be marked for the ingress data streams for which ingress congestion is detected. Further, as described for egress congestion detection and marking, ingress congestion can be detected in the aggregate across all ingress data streams, and then marked for all ingress data streams, or marked for selected ones of the ingress data streams.

Put simply, congestion control as taught herein can be applied to all (ingress or egress) data streams, or can be applied to selected ones of those streams. While other selection methods are contemplated herein, the (ingress or egress) data streams operated on to reduce congestion may be based on stream priorities, which may be dictated by minimum performance requirements and/or user classes—e.g., gold, silver, bronze—which may be associated with the different data streams. Further, it should be understood that egress congestion monitoring can be implemented independently of ingress congestion monitoring. That is, a node may be configured to implement egress data congestion monitoring and control, may be configured to implement ingress data congestion monitoring and control, or may be implemented to implement egress and ingress data congestion monitoring and control.

Figure 11:
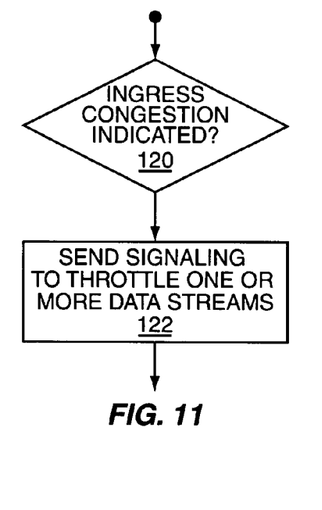
FIGS. 11-13 are logic flow diagrams illustrating various aspects of congestion control processing logic according to one or more embodiments of congestion control taught herein.
Figure 12:
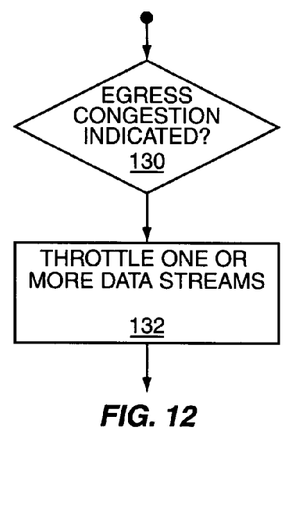

In any case, as depicted in FIG. 11, a given CE 50 in the RBS 40, or a given SE 60 in the RNC 42, can be configured to recognize that an aggregate or stream-specific ingress congestion indicator has been set (Step 120), and further configured to operate to relieve such congestion by sending signaling to one or more other network nodes to initiate throttling of the source data (Step 122). Further, FIG. 12 broadly illustrates that a given CE 50 in the RBS 40, or a given SE 60 in the RNC 42, can be configured to recognize that an aggregate or stream-specific egress congestion indicator has been set (Step 130), and further configured to operate to relieve such congestion by throttling of one or more egress data streams outgoing from the RBS 40 (or RNC 42) (Step 132). In at least one embodiment, each CE 50 in the RBS 40 (or each SE 60 in the RNC 42) operates independently of the other CEs 50 (or SEs 60). That is, each CE 50 (or SE 60) handles a specific pair of ingress and egress data streams, and thus carries out congestion control operations for those particular streams responsive to recognizing that aggregate or stream-specific congestion indicators have been set.

Figure 13:
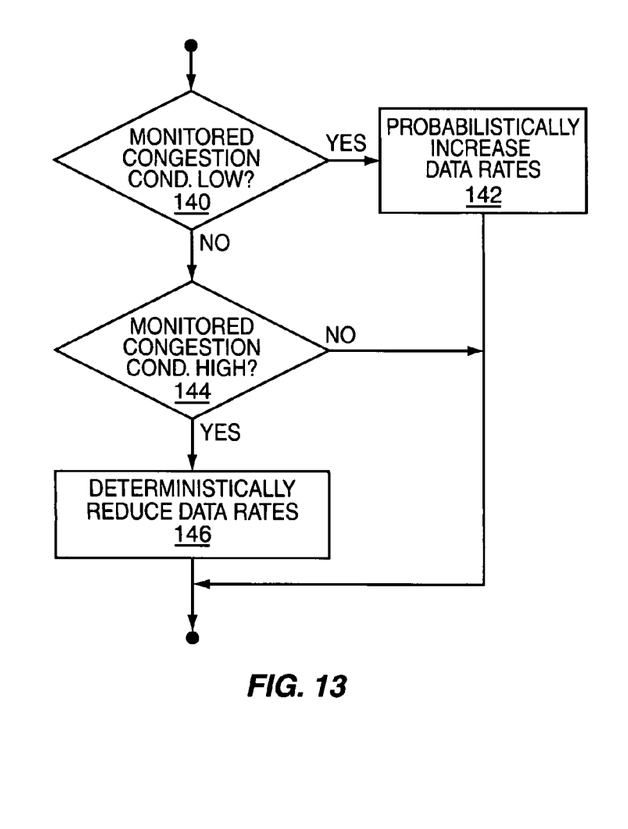

However, in at least one other embodiment, congestion control may be more centralized, or at least may consider the effects of congestion control across multiple ingress or egress data streams. For example, FIG. 13 depicts one embodiment of egress congestion control contemplated herein, which capitalizes on the HIGH/ACCEPTABLE/LOW egress link utilization monitoring depicted in FIG. 2, for example. Again, the discussion uses the RBS 40 of FIG. 8 as an example, but the same or similar logic can be implemented in the RNC 42.

With the above in mind, if monitored egress link utilization at the RBS 40 is low (Step 140), the RBS 40 probabilistically increases egress data rates for one or more of the egress data streams outgoing from it (Step 142). By increasing data rates probabilistically, some of the egress data stream rates will be increased, while others will not. The probability of increasing data rate can be adjusted as a function of where current link utilization is at, i.e., where in the low region observed link utilization at. The probabilistic adjustment can be performed in centralized fashion, e.g., the congestion control circuit 18-1 can perform the probabilistic rate increase evaluation for one or more of the data streams for which the rate could be increased, and then the results could be signaled internal to the RBS 40, e.g., the congestion control circuit 18-1 could signal the CEs 50 as needed in terms of data rate adjustments. Alternatively, the CEs 50 can be configured to perform the probabilistic rate increase logic.

Continuing with the illustrated processing logic, if monitored egress link utilization is too high (Step 144), the congestion control circuit 18 and/or the CEs 50 can be configured to deterministically reduce data rates for one or more egress data streams (Step 146). As with the probabilistic rate increases, the deterministic rate decreases can be decided by the congestion control circuit 18-1 and signaled to the involved ones of the CEs 50. Alternatively, the congestion control circuit 18-1 can be configured simply to indicate the egress congestion condition to the CEs 50, which in turn are configured to determine the deterministic rate increases.

Figure 14:
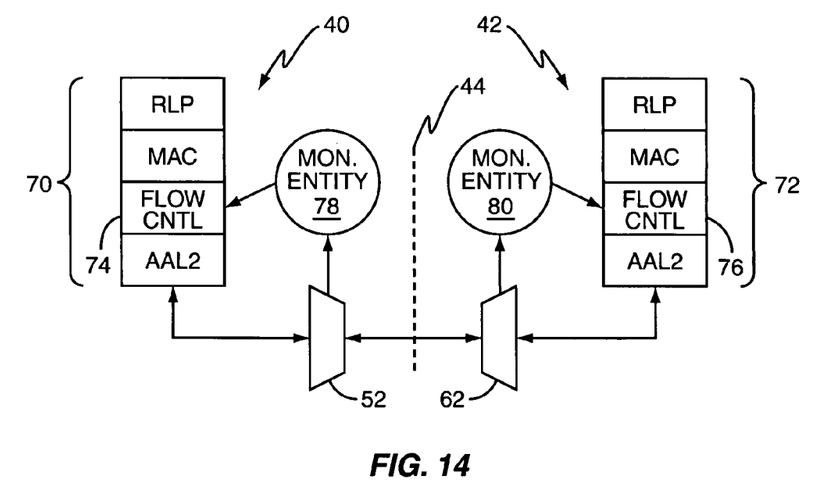
FIG. 14 is a block diagram of one embodiment of congestion monitoring and control, which may be functionally implemented in one or more congestion control circuits included in the radio base station and/or radio network controller of FIG. 8, for example.

FIG. 14 functionally illustrates how congestion control may be incorporated into the RBS 40 and 42, wherein the protocol stacks 70 and 72 include flow control elements 74 and 76, respectively. More particularly, the congestion control circuit 18-1 of FIG. 8 may be implemented via the flow control element 74 and a monitoring entity 78. The monitoring entity 78 can be centralized within the RBS 40, or distributed within the RBS 40. In any case, the monitoring entity can monitor for ingress/egress congestion conditions and provide congestion indicators to the flow control element 74, such as by marking ingress data, or by internal signaling within the RBS 40. In any case, the flow control element 74 can throttle one or more egress data streams if egress congestion is detected and/or sending signaling to initiate the throttling of data being sent to the RBS 40 to thereby relieve ingress congestion at the RBS 40. Similar congestion monitoring and flow control can be implemented in the RNC 42 via the monitoring entity 80 and the flow control element 76.

Figure 15:
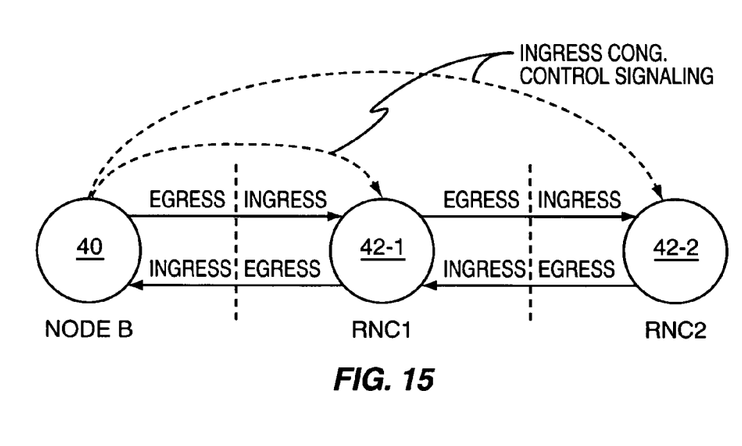
FIG. 15 is a block diagram of a radio base station coupled to a radio network controller through another, intervening radio network controller, and depicts the use of congestion control on the various links between the illustrated nodes.

These and other congestion control methods disclosed herein can be implemented across or through intervening nodes in a communication network, in addition to being implemented direction between coupled nodes. For example, FIG. 15 illustrates an RBS 40 that is coupled to an RNC 42-2 through an intervening RNC 42-1, such that congestion control can be conducted on the egress/ingress links between the RBS 40 and the RNC 42-1, on the ingress/egress links between the RNC 42-1 and the RNC 42-2, and on the indirect egress/ingress link between the RBS 40 and the RNC 42-2. Indeed, to the extent that ingress data incoming to the RBS 40 originates—at least from the RAN's perspective—from the RNC 42-2, the RBS 40 operates to relieve ingress congestion by sending signaling to the RNC 42-2, directing it to throttle one or more outgoing data streams being directed from it to the RBS 40, through the RNC 42-1. In general, any number of network nodes carrying associated traffic, whether acting as end-point nodes or intermediate nodes with respect to that traffic, can include congestion control circuits 18 to monitor and control congestion between nodes.

With the above range of variations in mind, it should be understood that the present invention is not limited by the foregoing description, nor is it limited by the accompanying drawings. Instead, the present invention is limited only by the following claims, and their legal equivalents.

What is claimed is:

1. A method of congestion control at a communication network node, the node handling a plurality of egress data streams and corresponding ingress data streams and comprising one or more applications, each application configured to process a different one of the ingress data streams, comprising:

monitoring egress data congestion conditions at the node for one or more of the egress data streams by comparing egress link utilization to one or more egress link utilization thresholds and setting egress congestion indicators in selected ones of the ingress data streams based on said comparing egress link utilization to the one or more egress link utilization thresholds;

reducing egress data rates responsive to detecting egress data congestion;

monitoring ingress data congestion conditions at the node for one or more of the ingress data streams by comparing ingress link utilization to one or more ingress link utilization thresholds and setting ingress data congestion indicators in selected ones of the ingress data streams based on said comparing ingress link utilization to the one or more ingress link utilization thresholds; and reducing ingress data rates responsive to detecting ingress data congestion;

wherein setting one or more ingress and egress congestion indicators in selected ones of the ingress data streams comprises selecting particular ones of the applications to be responsive to the ingress and egress congestion indicators, and setting one or more ingress and egress congestion indicators in ingress data streams that are processed by the selected applications.

2. The method of claim 1, wherein reducing egress data rates responsive to detecting egress data congestion comprises reducing egress data rates for egress data streams corresponding to the selected ones of the ingress data streams, responsive to detecting the egress congestion indicators in the selected ones of the ingress data streams, and wherein reducing ingress data rates responsive to detecting ingress data congestion comprises sending signaling from the node to indicate that ingress data rates should be reduced for the selected ones of the ingress data streams, responsive to detecting the ingress congestion indicators in the selected ones of the ingress data streams.

3. A communication network node for use in a communication network, said node handling a plurality of egress data streams and corresponding ingress data streams, the node comprising one or more applications, each application configured to process a different one of the ingress data streams, and one or more processing circuits configured to:

monitor for egress data congestion at the node for one or more egress data streams;

set one or more egress congestion indicators in selected ones of the ingress data streams if said egress monitoring indicates egress data congestion, by selecting particular ones of the applications to be responsive to the egress congestion indicators and setting one or more egress congestion indicators in ingress data streams that are processed by the selected applications; and reduce egress congestion responsive to the one or more egress congestion indicators.

4. The node of claim 3, wherein the node is configured to monitor for egress data congestion at the node for one or more egress data streams by comparing egress link utilization by the aggregate of those egress data streams to one or more utilization thresholds.

5. The node of claim 3, wherein the node is configured to set one or more egress congestion indicators in selected ones of the ingress data streams if the egress link utilization by the aggregate of the one or more egress data streams is above a higher utilization threshold or if an egress data queue size for the aggregate of those egress data streams is above an upper queue threshold, and clear the one or more egress congestion indicators in the selected ones of the ingress data streams if the egress link utilization by the aggregate of the one or more egress data streams is below a lower utilization threshold and the egress data queue size for the aggregate of those egress data streams is below a lower queue threshold.

6. The node of claim 3, wherein the node is configured to reduce egress congestion by reducing the amount of egress data output from the node for egress data streams corresponding to the selected ones of the ingress data streams.

7. A communication network node for use in a communication network, said node handling a plurality of egress data streams and corresponding ingress data streams, the node comprising one or more applications, each application configured to process a different one of the ingress data streams, and one or more processing circuits configured to:

monitor for ingress data congestion at the node for one or more ingress data streams;

set one or more ingress congestion indicators in selected ones of the ingress data streams if said ingress monitoring indicates ingress data congestion, by selecting particular ones of the applications to be responsive to the ingress congestion indicators and setting one or more ingress congestion indicators in ingress data streams that are processed by the selected applications; and reduce ingress congestion responsive to the one or more ingress congestion indicators.

8. The node of claim 7, wherein the node is configured to monitor for ingress data congestion at the node for one or more ingress data streams by comparing ingress link utilization by the aggregate of those ingress data streams to one or more utilization thresholds.

9. The node of claim 7, wherein the node is configured to set one or more ingress congestion indicators in selected ones of the ingress data streams if the ingress link utilization by the aggregate of the one or more ingress data streams is above a higher utilization threshold, and clear the one or more ingress congestion indicators in selected ones of the ingress data streams if the ingress link utilization by the aggregate of the one or more ingress data streams is below a lower utilization threshold and the ingress data queue size for those ingress data streams is below a lower queue threshold.

10. The node of claim 7, the node is configured to reduce ingress congestion by sending signaling from the node to reduce the amount of ingress data being sent to the node for the selected ones of the ingress data streams.

11. In a communication network, a method of congestion control at a communication network node, the node handling a plurality of egress data streams and corresponding ingress data streams and comprising one or more applications, each application configured to process a different one of the ingress data streams, the method comprising:

monitoring for egress data congestion at the node for one or more of the egress data streams;

setting one or more egress congestion indicators in selected ones of the ingress data streams if said egress monitoring indicates egress data congestion, by selecting particular ones of the applications to be responsive to the egress congestion indicators and setting one or more egress congestion indicators in ingress data streams that are processed by the selected applications; and reducing egress congestion responsive to the one or more egress congestion indicators.

12. The method of claim 11, further comprising monitoring for ingress data congestion for one or more ingress data streams at the node, setting one or more ingress congestion indicators in selected ones of the ingress data streams if said ingress monitoring indicates ingress data congestion, and reducing ingress congestion responsive to the one or more ingress congestion indicators.

13. The method of claim 12, wherein reducing ingress congestion comprises sending signaling from the node to initiate a reduction in the amount of ingress data being sent to the node for the selected ones of the ingress data streams.

14. The method of claim 11, wherein reducing egress congestion comprises relieving aggregate egress congestion conditions by operating on the egress data streams corresponding to the selected ones of the ingress data streams.

15. The method of claim 11, wherein, if said egress monitoring indicates acceptable egress congestion conditions, probabilistically increasing egress data rates for one or more of the egress data streams, and, if said egress monitoring indicates unacceptable egress congestion conditions, deterministically reducing egress data rates for one or more of the egress data streams.

16. The method of claim 12, wherein monitoring egress data congestion at the node for one or more egress data streams comprises monitoring egress link utilization by the aggregate of those egress data streams relative to one or more egress link utilization thresholds, and wherein monitoring ingress data congestion at the node for one or more ingress data streams comprises monitoring ingress link utilization by the aggregate of those ingress data streams relative to one or more ingress link utilization thresholds.

17. The method of claim 16, wherein monitoring egress data congestion at the node for the one or more egress data streams additionally comprises monitoring egress data queue size for the aggregate of those egress data streams relative to one or more queue thresholds.

18. The method of claim 17, wherein setting one or more egress congestion indicators in selected ones of the ingress data streams if said monitoring indicates egress data congestion comprises setting one or more egress congestion indicators if the egress link utilization by the aggregate of the one or more egress data streams is above a higher utilization threshold or if the egress data queue size for the aggregate of those egress data streams is above an upper queue threshold, and clearing the one or more egress congestion indicators if the egress link utilization by the aggregate of the one or more egress data streams is below a lower utilization threshold and the egress data queue size for the aggregate of those egress data streams is below a lower queue threshold.

19. The method of claim 12 wherein setting one or more ingress congestion indicators in selected ones of the ingress data streams comprises setting ingress congestion indicators in ingress data incoming to the node for the selected ones of the ingress data streams.

20. The method of claim 11, wherein setting one or more egress congestion indicators in selected ones of the ingress data streams comprises setting egress congestion indicators in ingress data incoming to the node for the selected ones of the ingress data streams.

21. The method of claim 11, wherein the egress data streams each have a priority, the priority of a particular egress data stream being lower or higher relative to that of a different egress data stream, and wherein setting one or more egress congestion indicators in selected ones of the ingress data streams comprises setting egress congestion indicators in ingress data streams corresponding to egress data streams having a relatively lower priority, but not in ingress data streams corresponding to egress data streams having a relatively higher priority.

22. The method of claim 11, wherein reducing egress congestion comprises reducing the amount of egress data output from the node for egress data streams corresponding to the selected ones of the ingress data streams.

23. In a communication network, a method of congestion control at a communication network node, the node handling a plurality of egress data streams and corresponding ingress data streams and comprising one or more applications, each application configured to process a different one of the ingress data streams, the method comprising:

monitoring for ingress data congestion for one or more of the ingress data streams at the node;

setting one or more ingress congestion indicators in selected ones of the ingress data streams if said ingress monitoring indicates ingress data congestion, by selecting particular ones of the applications to be responsive to the ingress congestion indicators and setting one or more ingress congestion indicators in ingress data streams that are processed by the selected applications; and reducing ingress congestion responsive to the one or more ingress congestion indicators.

24. The method of claim 23, further comprising monitoring for egress data congestion for one or more egress data streams at the node, setting one or more egress congestion indicators in selected ones of the ingress data streams if said egress monitoring indicates egress data congestion, and reducing egress congestion responsive to the one or more egress congestion indicators.

25. The method of claim 24, wherein reducing egress congestion comprises reducing the amount of egress data output from the node for egress data streams corresponding to the selected ones of the ingress data streams.

26. The method of claim 23, wherein reducing ingress congestion comprises relieving aggregate ingress congestion conditions by operating on the selected ingress data streams.

27. The method of claim 24, wherein, if said egress monitoring indicates acceptable egress congestion conditions, probabilistically increasing egress data rates for one or more of the egress data streams, and, if said egress monitoring indicates unacceptable egress congestion conditions, deterministically reducing egress data rates for one or more of the egress data streams.

28. The method of claim 24, wherein monitoring egress data congestion at the node for one or more egress data streams comprises monitoring egress link utilization by the aggregate of those egress data streams relative to one or more egress link utilization thresholds, and wherein monitoring ingress data congestion at the node for one or more ingress data streams comprises monitoring ingress link utilization by the aggregate of those ingress data streams relative to one or more ingress link utilization thresholds.

29. The method of claim 28, wherein monitoring egress data congestion at the node for the one or more egress data streams additionally comprises monitoring egress data queue size for the aggregate of those egress data streams relative to one or more queue thresholds.

30. The method of claim 29, wherein setting one or more egress congestion indicators in selected ones of the ingress data streams if said monitoring indicates egress data congestion comprises setting one or more egress congestion indicators if the egress link utilization by the aggregate of the one or more egress data streams is above a higher utilization threshold or if the egress data queue size for the aggregate of those egress data streams is above an upper queue threshold, and clearing the one or more egress congestion indicators if the egress link utilization by the aggregate of the one or more egress data streams is below a lower utilization threshold and the egress data queue size for the aggregate of those egress data streams is below a lower queue threshold.

31. The method of claim 23, wherein the ingress data streams each have a priority, the priority of a particular ingress data stream being lower or higher relative to that of a different ingress data stream, and wherein setting one or more ingress congestion indicators in selected ones of the ingress data streams comprises setting ingress congestion indicators in ingress data streams having a relatively lower priority, but not in ingress data streams having a relatively higher priority.

32. The method of claim 24, wherein setting one or more egress congestion indicators in selected ones of the ingress data streams comprises setting egress congestion indicators in ingress data incoming to the node for the selected ones of the ingress data streams.

33. The method of claim 23, wherein setting one or more ingress congestion indicators in selected ones of the ingress data streams comprises setting ingress congestion indicators in ingress data incoming to the node for the selected ones of the ingress data.

34. The method of claim 23, wherein reducing ingress congestion comprises sending signaling from the node to reduce the amount of ingress data being sent to the node for the selected ones of the ingress data streams.

35. A communication network node for use in a communication network, said node handling a plurality of egress data streams and corresponding ingress data streams, the node comprising one or more applications, each application configured to process a different one of the ingress data streams, and one or more processing circuits configured to:
monitor for egress and ingress data congestion at the node for one or more egress and ingress data streams, respectively;
set one or more egress congestion indicators in selected ones of the ingress data streams if said egress monitoring indicates egress data congestion, and set one or more ingress congestion indicators in the selected ingress data streams if said ingress monitoring indicates ingress data congestion; and
reduce egress congestion responsive to the one or more egress congestion indicators, and reduce ingress congestion responsive to the one or more ingress congestion indicators;
wherein the node is configured to set one or more ingress and egress congestion indicators in selected ones of the ingress data streams by selecting particular ones of the applications to be responsive to the ingress and egress congestion indicators and setting one or more ingress and egress congestion indicators in ingress data streams that are processed by the selected applications.

36. The node of claim 35, wherein the node is configured to reduce egress congestion by reducing the amount of egress data output from the node for egress data streams corresponding to the selected ones of the ingress data streams, and to reduce ingress congestion by sending signaling from the node to initiate a reduction in the amount of ingress data being sent to the node for the selected ones of the ingress data streams.

37. The node of claim 35, wherein the node is configured to set egress congestion indicators in selected ones of the ingress data streams by setting egress congestion indicators in ingress data incoming to the node for the selected ones of the ingress data streams, and is configured to set ingress congestion indicators in selected ones of the ingress data streams by setting ingress congestion indicators in ingress data incoming to the node for the selected ones of the ingress data streams.

38. The node of claim 35, wherein the node is configured to probabilistically increase egress data rates for one or more of the egress data streams if said egress monitoring indicates acceptable egress congestion conditions, and is configured to deterministically decrease egress data rates for one or more of the egress data streams if said egress monitoring indicates unacceptable egress congestion conditions.

39. The node of claim 35, wherein the ingress and egress data streams each have a priority, the priority of a particular ingress or egress data stream being lower or higher relative to that of a different ingress or egress data stream, respectively, and wherein the one or more processing circuits are configured to set one or more ingress and egress congestion indicators by setting ingress and egress congestion indicators for ingress and egress data streams having a relatively lower priority, but not for ingress and egress data streams having a relatively higher priority.

40. The node of claim 35, wherein the node is configured to monitor egress data congestion at the node for one ore more egress data streams by monitoring egress link utilization by the aggregate of those egress data streams relative to one or more egress link utilization thresholds, and is configured to monitor ingress data congestion at the node for one or more ingress data streams by monitoring ingress link utilization by the aggregate of those ingress data streams relative to one or more ingress link utilization thresholds.

41. The node of claim 40, wherein the node is configured to monitor egress data congestion at the node for the one or more egress data streams by additionally monitoring egress data queue size for the aggregate of those egress data streams relative to one or more queue thresholds.

42. The node of claim 41, wherein the node is configured to set the one or more egress congestion indicators in selected ones of the ingress data streams if said monitoring indicates egress data congestion by setting the one or more egress congestion indicators if the egress link utilization by the aggregate of the one or more egress data streams is above a higher utilization threshold or if the egress data queue size for the aggregate of those egress data streams is above an upper queue threshold, and is configured to clear the one or more egress congestion indicators if the egress link utilization by the aggregate of the one or more egress data streams is below a lower utilization threshold and the egress data queue size for the aggregate of those egress data streams is below a lower queue threshold.

43. The method of claim 1, wherein setting egress congestion indicators in selected ones of the ingress data streams comprises setting egress congestion indicators in ingress data incoming to the node for the selected ones of the ingress data streams, and wherein setting ingress congestion indicators in selected ones of the ingress data streams comprises setting ingress congestion indicators in ingress data incoming to the node for the selected ones of the ingress data streams.

44. The method of claim 1, wherein the ingress and egress data streams each have a priority, the priority of a particular ingress or egress data stream being lower or higher relative to that of a different ingress or egress data stream, respectively, wherein setting one or more ingress congestion indicators in selected ones of the ingress data streams comprises setting ingress congestion indicators in ingress data streams having a relatively lower priority, but not in ingress data streams having a relatively higher priority, and wherein setting one or more egress congestion indicators in selected ones of the ingress data streams comprises setting egress congestion indicators in ingress data streams corresponding to egress data streams having a relatively lower priority, but not in ingress data streams corresponding to egress data streams having a relatively higher priority.

45. The node of claim 3, wherein the one or more processing circuits are configured to set egress congestion indicators in selected ones of the ingress data streams by setting egress congestion indicators in ingress data incoming to the node for the selected ones of the ingress data streams.

46. The node of claim 3, wherein the egress data streams each have a priority, the priority of a particular egress data stream being lower or higher relative to that of a different egress data stream, and wherein the one or more processing circuits are configured to set one or more egress congestion indicators in selected ones of the ingress data streams by setting egress congestion indicators in ingress data streams corresponding to egress data streams having a relatively lower priority, but not in ingress data streams corresponding to egress data streams having a relatively higher priority.

47. The node of claim 7, wherein the one or more processing circuits are configured to set ingress congestion indicators in selected ones of the ingress data streams by setting ingress congestion indicators in ingress data incoming to the node for the selected ones of the ingress data streams.

48. The node of claim 7, wherein the ingress data streams each have a priority, the priority of a particular ingress data stream being lower or higher relative to that of a different ingress data stream, and wherein the one or more processing circuits are configured to set one or more ingress congestion indicators in selected ones of the ingress data streams by setting ingress congestion indicators in ingress data streams having a relatively lower priority, but not in ingress data streams having a relatively higher priority.

* * * * *

UNITED STATES PATENT AND TRADEMARK OFFICE
CERTIFICATE OF CORRECTION

PATENT NO. : 7,796,507 B2  Page 1 of 1
APPLICATION NO. : 11/321727
DATED : September 14, 2010
INVENTOR(S) : Gholmieh et al.

It is certified that error appears in the above-identified patent and that said Letters Patent is hereby corrected as shown below:

In Column 4, Line 13, delete "($S_{Tx}$)" and insert -- ($S_{TX}$) --, therefor.

In Column 4, Line 42, delete "UTX" and insert -- $U_{TX}$ --, therefor.

In Column 4, Line 42, delete "IF" and insert -- if --, therefor.

In Column 4, Line 43, delete "STX" and insert -- $S_{TX}$ --, therefor.

In Column 4, Line 49, delete "URX" and insert -- $U_{RX}$ --, therefor.

In Column 8, Line 24, delete "(VOIP)" and insert -- (VoIP) --, therefor.

In Column 13, Line 38, in Claim 19, delete "12" and insert -- 12, --, therefor.

Signed and Sealed this
Fifteenth Day of March, 2011

David J. Kappos
*Director of the United States Patent and Trademark Office*